(12) United States Patent
Fujita

(10) Patent No.: US 6,945,351 B2
(45) Date of Patent: Sep. 20, 2005

(54) POWER STEERING APPARATUS

(75) Inventor: Kazuhiko Fujita, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/210,080

(22) Filed: Aug. 2, 2002

(65) Prior Publication Data

US 2003/0024758 A1 Feb. 6, 2003

(30) Foreign Application Priority Data

Aug. 6, 2001 (JP) ..................................... P2001-238237

(51) Int. Cl.⁷ ............................................... B62D 5/06
(52) U.S. Cl. ..................................... 180/422; 180/417
(58) Field of Search ............................... 180/443, 444, 180/446, 422, 417, 403; 701/41, 42

(56) References Cited

U.S. PATENT DOCUMENTS

| 4,611,682 A | | 9/1986 | Yasuda et al. | |
|---|---|---|---|---|
| 4,657,103 A | * | 4/1987 | Shimizu | ..................... 180/446 |
| 4,753,308 A | | 6/1988 | Noto et al. | |
| 5,257,828 A | | 11/1993 | Miller et al. | |
| 5,767,642 A | * | 6/1998 | Furukawa | ................... 318/286 |
| 5,786,674 A | * | 7/1998 | Kress et al. | ................. 318/268 |
| 5,984,042 A | * | 11/1999 | Nishimoto et al. | ......... 180/446 |
| 6,092,012 A | * | 7/2000 | Shimizu | ...................... 701/41 |
| 6,131,059 A | * | 10/2000 | Kaji et al. | ..................... 701/41 |
| 6,148,949 A | * | 11/2000 | Kobayashi et al. | ......... 180/446 |
| 6,219,604 B1 | | 4/2001 | Dilger et al. | |
| 6,244,372 B1 | * | 6/2001 | Sakamaki et al. | .......... 180/422 |
| 6,311,799 B1 | | 11/2001 | Kaji | |
| 6,389,342 B1 | * | 5/2002 | Kanda | ......................... 701/41 |
| 6,422,336 B1 | * | 7/2002 | Abele et al. | ................. 180/446 |
| 6,490,514 B2 | * | 12/2002 | Kurishige et al. | ............ 701/41 |
| 2001/0027364 A1 | * | 10/2001 | Matsuoka | ..................... 701/41 |

FOREIGN PATENT DOCUMENTS

| EP | 1 043 211 A2 | | 10/2000 | |
|---|---|---|---|---|
| GB | 2233293 A | * | 1/1991 | ............ B62D/5/06 |
| JP | 59-118577 | | 7/1984 | |
| JP | 6-206571 | | 7/1994 | |
| JP | 2000-95129 | | 4/2000 | |

* cited by examiner

Primary Examiner—Daniel G. DePumpo
(74) Attorney, Agent, or Firm—McGinn & Gibb, PLLC

(57) ABSTRACT

In a power steering apparatus, a basic-target-rotational-speed setting portion 42 sets a basic target rotational speed Rb of an electric motor 27 on the basis of the vehicle speed and the angular velocity of steering. A temperature-coefficient setting portion 43 sets a temperature coefficient α which becomes smaller with an increase in the temperature. A target-rotational-speed setting portion 44 sets a target rotational speed R of the electric motor 27 on the basis of the formula R=α·Rb. A motor-drive control portion 45 controls a drive circuit 28 so that this target rotational speed R will be attained.

11 Claims, 8 Drawing Sheets

POWER STEERING APPARATUS

BACKGROUND OF THE INVENTION

The present invention relates to a power steering apparatus for generating a steering assisting force to be imparted to a steering mechanism by hydraulic pressure produced by a pump driven by an electric motor.

A power steering apparatus is known which assists the steering of a steering wheel by supplying a hydraulic fluid from an oil pump to a power cylinder connected to a steering mechanism. The oil pump is driven by an electric motor so that a steering assisting force corresponding to the rotational speed of the electric motor is generated from the power cylinder.

A torsion bar which produces torsion in correspondence with the direction and magnitude of the steering torque applied to the steering wheel, as well as a hydraulic control valve whose opening degree changes in correspondence with the direction and magnitude of the torsion of the torsion bar, are incorporated in a steering shaft. This hydraulic control valve is interposed in a hydraulic system between the oil pump and the power cylinder, and causes a steering assisting force corresponding to the steering torque to be generated from the power cylinder.

Control of the driving of the electric motor is effected on the basis of, for instance, angular velocity of steering of the steering wheel. Namely, the angular velocity of steering is determined on the basis of an output of a steering sensor provided in association with the steering wheel, and a target rotational speed of the electric motor is set on the basis of this angular velocity of steering. A voltage is supplied to the electric motor so that this target rotational speed will be attained.

Specifically, as shown in FIG. 10, the target rotational speed is set so as to increase up to a maximum rotational speed as the angular velocity of steering increases. Consequently, a steering assisting force corresponding to the angular velocity of steering is generated.

In a case where the steering wheel is continuously steered without driving, and in a case where a steering-maintained state continues in which the steering wheel is held with-torque being applied thereto, the electric motor assumes a continuously energized state, and there is a possibility of this electric motor assuming a state of an abnormally high temperature and undergoing a failure. Accordingly, a temperature sensor for detecting the temperature of the electric motor is provided, and the maximum rotational speed of the electric motor is limited on the basis of an output of this temperature sensor.

Specifically, as shown in FIG. 11, the overheating of the electric motor is prevented such that the higher the temperature of the electric motor, the lower the maximum rotational speed of the electric motor is set.

Namely, when the temperature of the electric motor becomes high, the maximum rotational speed of the electric motor is limited, as shown by the two-dot chain line in FIG. 10.

With the above-described configuration, however, as shown in FIG. 12, when the temperature of the electric motor is high, the steering effort (the force applied to the steering wheel by the driver) increases sharply in conjunction with an increase in the angular velocity of steering. For this reason, since the steering resistance suddenly becomes large at the time of sudden steering for avoiding an emergency, the driver feels that the steering has suddenly become heavy. This not only deteriorates steering feel but also hinders proper steering.

On the other hand, as another problem, depending on the steering situation there are cases where the driver feels that the steering is light or heavy owing primarily to the inertia of the electric motor, and discomfort of steering thereby occurs. This problem can be alleviated by using a low-inertia rotor, by adopting a three-phase bipolar motor drive system, or by making nonlinear the target rotational speed with respect to the angular velocity of steering.

However, these solutions make the electric motor and its drive circuit expensive or makes inevitable an increase in the capacity of the ROM of a microcomputer, so that an increase in cost is consequently unavoidable.

SUMMARY OF THE INVENTION

Accordingly, an object of the invention is to provide a power steering apparatus which makes it possible to protect the electric motor from overheating without sacrificing the steering feel at the time of sudden steering, thereby overcoming the above-described technical problems.

Another object of the invention is to provide a power steering apparatus which makes it possible to alleviate or overcome the discomfort of steering without incurring an increase in the cost.

In the invention, there is provided a power steering apparatus for generating a steering assisting force by hydraulic pressure generated by a pump (26) driven by an electric motor (27), characterized by comprising: steering detecting means (11, 41) for detecting the steering by an operation member (2) for steering; driving-target-basic-value setting means (42) for setting a driving target basic value for driving the electric motor on the basis of an output signal of the steering detecting means; temperature detecting means (15) for detecting a temperature of the electric motor; temperature-coefficient setting means (43) for setting a temperature coefficient, which becomes smaller as the temperature of the electric motor becomes higher, on the basis of an output of the temperature detecting means; driving-target-value setting means (44) for setting a driving target value for driving the electric motor by multiplying the driving target basic value set by the driving-target-basic-value setting means by the temperature coefficient set by the temperature-coefficient setting means; and motor driving means (45) for driving the electric motor on the basis of the driving target value set by the driving-target-value setting means. It should be noted that numerals in the parentheses denote corresponding component elements and the like in the embodiments which will be described later. Hereafter, the same applies in this section.

In accordance with the above-described configuration, the driving target value for driving the electric motor is set by multiplying the driving target basic value set on the basis of an output signal of the steering detecting means by the temperature coefficient. The higher the temperature of the electric motor, the smaller the temperature coefficient is set to be, so that the higher the temperature, the smaller value the driving target value assumes.

Accordingly, as the temperature of the electric motor rises, the driving target value is suppressed to a low level over the entire range of the output of the steering detecting means, thereby preventing an excessive temperature rise of the electric motor.

As the steering detecting means, it is possible to employ, for instance, the steering-angular-velocity detecting means

(41) for detecting the angular velocity of steering, in which case the driving target value in the entire range of the angular velocity of steering is suppressed to a low level in conjunction with a temperature rise of the electric motor.

Accordingly, the phenomenon ceases to occur in which the steering operation is heavy only at the time of emergency steering, and it becomes possible to suppress the discomfort of steering.

In the invention, there is provided a power steering apparatus for generating a steering assisting force by hydraulic pressure generated by a pump (26) driven by an electric motor (27), characterized by comprising: steering-angular-velocity detecting means (41) for detecting the angular velocity of steering by an operation member (2) for steering; steering-angular-acceleration detecting means (51) for detecting the angular acceleration of steering by an operation by the operation member; driving-target-basic-value setting means (42) for setting a driving target basic value for driving the electric motor on the basis of an output signal of the steering-angular-velocity detecting means; correction-value setting means (52) for setting a correction value for correcting the driving target basic value on the basis of an output of the steering-angular-acceleration detecting means; driving-target-value setting means (54) for setting a driving target value for driving the electric motor by correcting the driving target basic value set by the driving-target-basic-value setting means by the correction value set by the correction-value setting means; and motor driving means (45) for driving the electric motor on the basis of the driving target value set by the driving-target-value setting means.

In accordance with this configuration, the driving target value for driving the electric motor is set by correcting the driving target basic value set on the basis of the angular velocity of steering by a correction value set on the basis of the angular acceleration of steering. As a result, it is possible to overcome the discomfort of steering due to the inertia of the electric motor without incurring an increase in the cost.

In the invention, there is provided a power steering apparatus is characterized by comprising: steering-direction detecting means (11, 30) for detecting whether the steering by the operation member is steering-wheel-turning steering, which is steering in a direction away from a midpoint of a steering angle, or steering-wheel-returning steering, which is steering in a direction-toward the midpoint of the steering angle, wherein the driving-target-basic-value setting means sets the driving target basic value corresponding to the angular velocity of steering such that the driving target basic value at the time of steering-wheel-turning steering becomes larger than the driving target basic value at the time of steering-wheel-returning steering.

In accordance with this configuration, the steering assisting force can be made large at the time of steering-wheel-turning steering when the reaction force from the road surface is large, while the steering assisting force can be made small at the time of steering-wheel-returning steering when the reaction force from the road surface is small. Consequently, it is possible to improve the steering feel.

The present disclosure relates to the subject matter contained in Japanese patent application No. 2001-238237 (filed on Aug. 6, 2001), which is expressly incorporated herein by reference in its entirety.

DESCRIPTION OF THE PREFERRED EMBODIMENT

Hereafter, a detailed description will be given of the embodiments of this invention with reference to the accompanying drawings.

Figure 1:
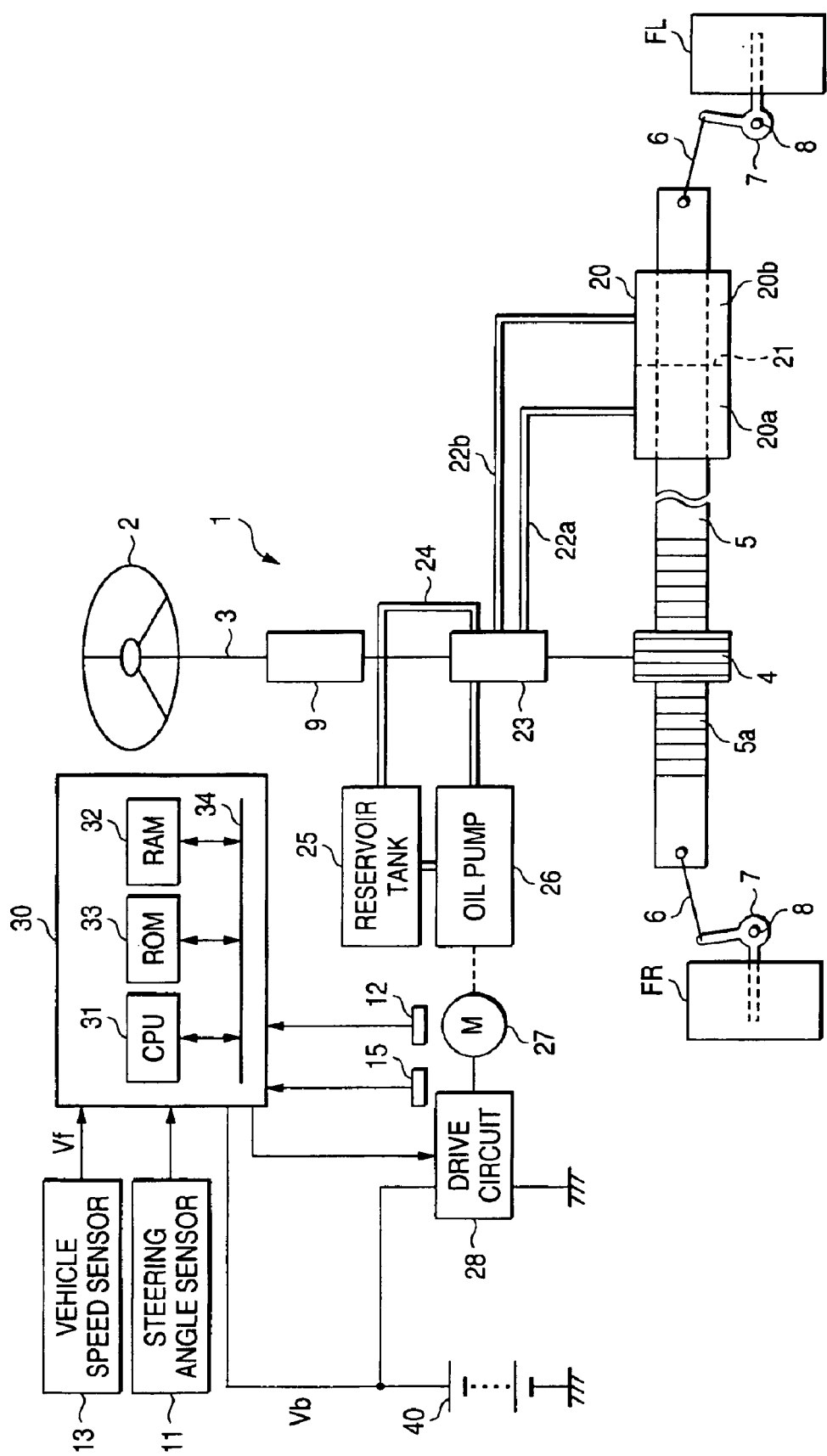
FIG. 1 is a conceptual diagram illustrating the basic configuration of a power steering apparatus in accordance with an embodiment of the invention.

FIG. 1 is a conceptual diagram illustrating a basic configuration of a power steering apparatus in accordance with an embodiment of the invention. This power steering apparatus is provided in association with a steering mechanism 1 of a vehicle so as to impart a steering assisting force to this steering mechanism 1.

The steering mechanism 1 is comprised of a steering wheel 2 which is operated by a driver, a steering shaft 3 connected to the steering wheel 2, a pinion gear 4 provided at a tip of the steering shaft 3, and a rack shaft 5 having a rack gear portion 5a meshing with the pinion gear 4 and extending in the widthwise direction of the vehicle. Tie rods 6 are respectively connected to both ends of the rack shaft 5, and the tie rods 6 are respectively connected to knuckle arms 7 for supporting front left and right wheels FL and FR serving as wheels to be steered. Each knuckle arm 7 is provided so as to be rotatable about a king pin 8.

Due to this configuration, when the steering wheel 2 is operated to rotate the steering shaft 3, this rotation is converted to linear motion along the widthwise direction of the vehicle by the pinion gear 4 and the rack shaft 5. This linear motion is converted to the rotation of the knuckle arms 7 about the king pins 8, whereby the steering of the front left and right wheels FL and FR is attained.

A torsion bar 9 which produces torsion in correspondence with the direction and magnitude of the steering torque applied to the steering wheel 2, as well as a hydraulic control valve 23 whose opening degree changes in correspondence with the direction and magnitude of the torsion of the torsion bar 9, are built on the steering shaft 3. The hydraulic control valve 23 is connected to a power cylinder 20 for imparting a steering assisting force to the steering mechanism 1. The power cylinder 20 has a piston 21 provided integrally on the rack shaft 5 as well as a pair of cylinder chambers 20a and 20b partitioned by the piston 21. The cylinder chambers 20a and 20b are respectively connected to the hydraulic control valve 23 through oil supply/return lines 22a and 22b.

Further, the hydraulic control valve 23 is interposed midway in an oil circulating line 24 which passes through a reservoir tank 25 and an oil pump 26. The oil pump 26 is driven by an electric motor 27, pumps out the hydraulic fluid stored in the reservoir tank 25, and supplies it to the hydraulic control valve 23. An excess hydraulic fluid is returned from the hydraulic control valve 23 to the reservoir tank 25 through the oil circulating line 24.

In a case where torsion in one direction is applied to the torsion bar 9, the hydraulic control valve 23 supplies the hydraulic fluid to one of the cylinder chambers 20a and 20b of the power cylinder 20 through one of the oil supply/return lines 22a and 22b. Meanwhile, in a case where torsion in the other direction is applied to the torsion bar 9, the hydraulic control valve 23 supplies the hydraulic fluid to the other one of the cylinder chambers 20a and 20b through the other one of the oil supply/return lines 22a and 22b. In a case where practically no torsion is applied to the torsion bar 9, the hydraulic control valve 23 assumes a so-called equilibrium state, and the hydraulic fluid is circulated in the oil circulating line 24 without being supplied to the power cylinder 20.

When the hydraulic fluid is supplied to either cylinder chamber of the power cylinder 20, the piston 21 moves along the widthwise direction of the vehicle. As a result, the steering assisting force is applied to the rack shaft 5.

An example of the configuration relating to the hydraulic control valve 23 is disclosed in detail in JP-A-59-118577, for example.

The electric motor 27 is constituted by, for example, a brushless motor, and is controlled by an electronic control unit 30 through a drive circuit 28. The drive circuit 28 is constituted by, for example, a bridge circuit of power transistors, and supplies electric power from a vehicle-mounted battery 40 serving as a power supply to the electric motor 27 in response to a control signal imparted from the electronic control unit 30.

The electronic control unit 30 includes a microcomputer which operates by receiving electric power supply from the vehicle-mounted battery 40, and this microcomputer has a CPU 31, a RAM 32 for providing such as a work area for the CPU 31, a ROM 33 for storing an operating program for the CPU 31, controlling data, and the like, and a bus 34 for interconnecting the CPU 31, the RAM 32, and the ROM 33.

Steering angle data which is outputted from a steering angle sensor 11 is imparted to the electronic control unit 30. The steering angle sensor 11 is provided in association with the steering wheel 2, and by using as an initial value "0" the steering angle of the steering wheel 2 when an ignition key switch is turned on and the engine is started, the steering angle sensor 11 outputs steering angle data which corresponds to a relative steering angle from this initial value and has a code corresponding to the steering direction. On the basis of this steering angle data, the CPU 31 calculates an angular velocity of steering corresponding to its time derivative.

A current detection signal from a current detection circuit 12 for detecting the current flowing across the electric motor 27, as well as a detection signal from a temperature sensor 15 for detecting the temperature of the electric motor 27, are further imparted to the electronic control unit 30.

Furthermore, a vehicle speed signal which is outputted from a vehicle speed sensor 13 is imparted to the electronic control unit 30. The vehicle speed sensor 13 may be one which directly detects the vehicle speed, or may be one which determines by calculation the vehicle speed on the basis of an output pulse of a vehicle wheel speed sensor provided in association with a vehicle wheel.

The electronic control unit 30 controls the driving of the electric motor 27 on the basis of the steering angle data, current data, and vehicle speed data which are respectively imparted from the steering angle sensor 11, the current detection circuit 12, and the vehicle speed sensor 13.

Figure 2:
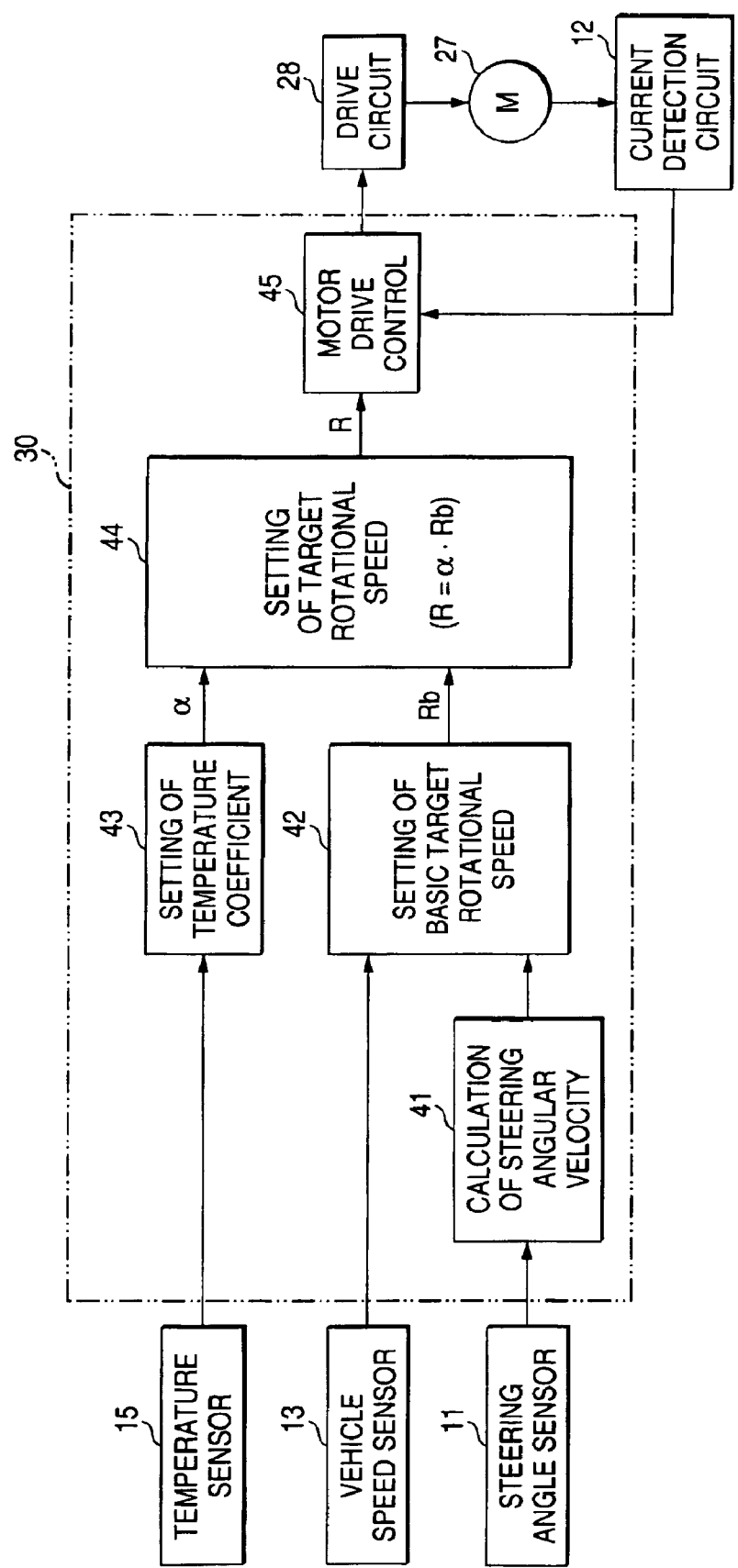
FIG. 2 is a block diagram illustrating the functional configuration of an electronic control unit of the power steering apparatus.

FIG. 2 is a block diagram illustrating a functional configuration of the electronic control unit 30. The electronic control unit 30 substantially has a plurality of function means which are realized as the CPU 31 executes the program stored in the ROM 33. Namely, the electronic control unit 30 has a steering-angular-velocity calculating portion 41 for calculating the angular velocity of steering on the basis of an output signal from the steering angle sensor 11; a basic-target-rotational-speed setting portion 42 for setting a basic target rotational speed Rb, which is a basic value of the target rotational speed of the electric motor 27, on the basis of the angular velocity of steering calculated by this steering-angular-velocity calculating portion 41; and a temperature-coefficient setting portion 43 for setting a temperature coefficient α (e.g., $0 \leq \alpha \leq 1$) corresponding to the temperature of the electric motor 27 detected by the temperature sensor 15.

Furthermore, the electronic control unit 30 has a target-rotational-speed setting portion 44 for calculating and setting a target rotational speed $R = \alpha \cdot Rb$ of the electric motor 27 by multiplying the basic target rotational speed Rb set by the basic-target-rotational-speed setting portion 42 by the temperature coefficient α set by the temperature-coefficient setting portion 43, as well as a motor-drive control portion 45 for controlling the driving of the electric motor 27 so that the target rotational speed R set by this target-rotational-speed setting portion 44 will be attained. The motor-drive control portion 45 generates a control signal for attainment of the target rotational speed R on the basis of the motor current detected by the current detection circuit 12, and imparts this control signal to the drive circuit 28.

Figure 3:
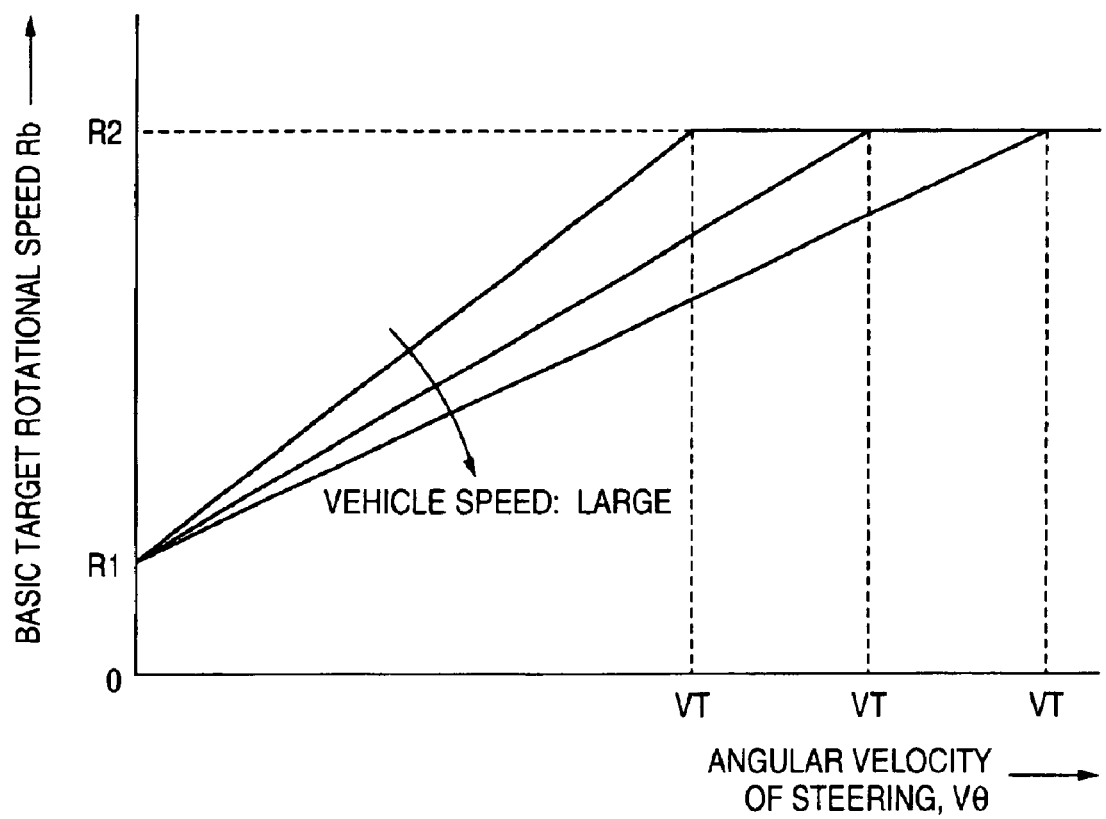
FIG. 3 is a characteristic diagram illustrating the relationship between the angular velocity of steering and the basic target rotational speed.

FIG. 3 is a characteristic diagram illustrating the relationship between the angular velocity of steering and the basic target rotational speed which is set by the basic-target-rotational-speed setting portion 42. The basic target rotational speed Rb is set between a lower limit R1 and an upper limit R2 so as to increase monotonously (increase linearly in this embodiment) within the range of $0 \leq V\theta \leq VT$ (VT denotes a threshold) for the section of an angular velocity of steering, Vθ.

As shown in FIG. 3, the basic-target-rotational-speed setting portion 42 variably sets the inclination of the basic target rotational speed Rb with respect to the angular velocity of steering, Vθ, on the basis of the vehicle speed. Namely, the threshold VT is variably set in accordance with vehicle speed ranges. More specifically, the greater the vehicle speed, the greater value the threshold VT is set to. Consequently, the greater the vehicle speed, the smaller the target rotational speed R is set to be, so that the steering assisting force becomes the smaller. Thus vehicle-speed response control is effected for generating an appropriate steering assisting force corresponding to the vehicle speed.

Figure 4:
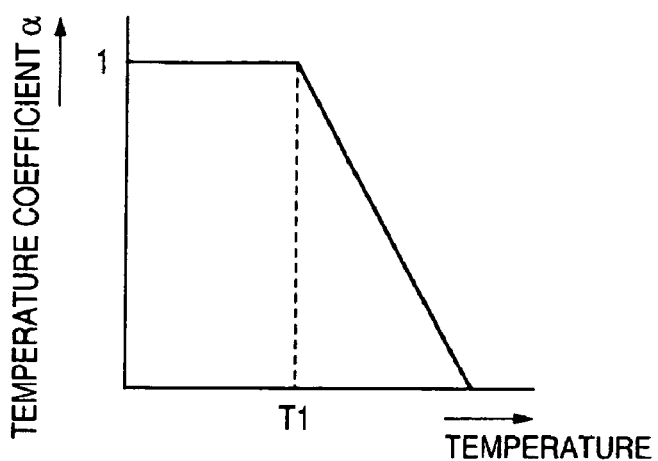
FIG. 4 is a characteristic diagram illustrating an example of the setting of a temperature coefficient.

FIG. 4 is a characteristic diagram for explaining the temperature coefficient α which is set by the temperature-coefficient setting portion 43. The temperature coefficient α is set in such a manner as to become smaller as the temperature becomes higher. More specifically, the temperature coefficient α is determined such that a fixed temperature coefficient (e.g., α=1) is maintained up to a predetermined temperature T1, and if the predetermined temperature T1 is exceeded, the temperature coefficient decreases monotonously (decreases linearly in this embodiment) as the temperature rises.

Figure 5:
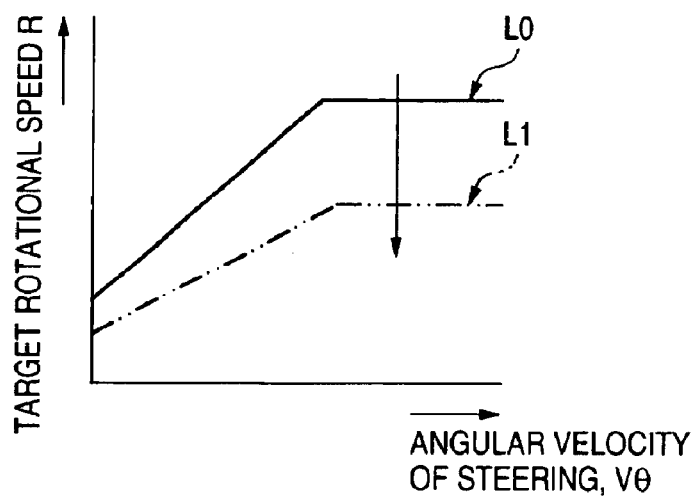
FIG. 5 is a characteristic diagram illustrating the relationship between the target rotational speed and the angular velocity of steering.

FIG. 5 is a characteristic diagram illustrating the relationship between the angular velocity of steering, Vθ, and the target rotational speed R which is set by the target-rotational-speed setting portion 44. If the temperature of the electric motor 27 is less than or equal to the predetermined temperature T1, the target rotational speed R shows a change such as a curve L0 with respect to the angular velocity of steering, Vθ. On the other hand, if the temperature of the electric motor 27 exceeds the predetermined temperature T1, the target rotational speed R is decreased over the entire section of the angular velocity of steering, Vθ, and shows a change such as a curve L1 with respect to the angular velocity of steering, Vθ.

Figure 6:
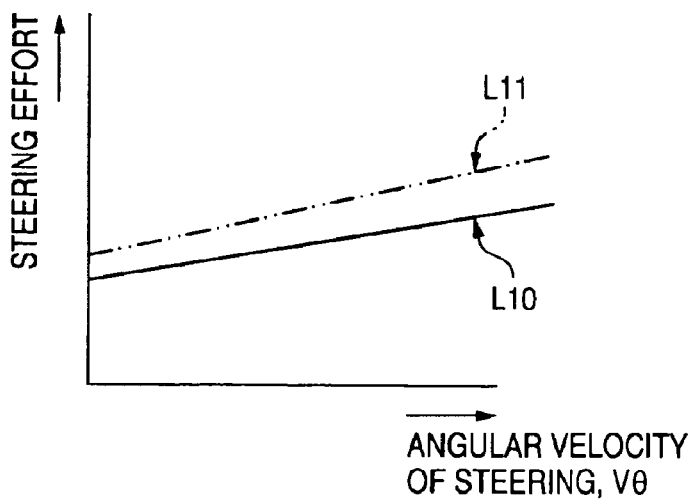
FIG. 6 is a characteristic diagram illustrating the relationship between the angular velocity of steering and the steering effort.

FIG. 6 is a characteristic diagram illustrating the relationship between the angular velocity of steering, Vθ, and the steering effort (the force applied to the steering wheel 2 by the driver). The curve L10 corresponds to the curve Lθ in FIG. 5, while the curve L11 corresponds to the curve L1 in FIG. 5. As can be appreciated from FIG. 6, if the temperature of the electric motor 27 becomes high, the steering effort increases uniformly over the entire section of the angular velocity of steering, Vθ. Accordingly, the phenomenon ceases to occur in which steering becomes heavy only in the case where the angular velocity of steering, Vθ, is large as at the time of emergency steering. Hence, it becomes possible to effect appropriate steering assist as practically as possible without deteriorating the steering feel.

As described above, in accordance with this embodiment, the target rotational speed R is set by multiplying the basic target rotational speed Rb by the temperature coefficient α which decreases with the temperature rise of the electric motor 27, and the target rotational speed R is reduced over the entire region of the angular velocity of steering, Vθ, thereby protecting the electric motor 27 from an excessive temperature rise. Consequently, since the driver does not feel that the steering has suddenly become heavy at the time of emergency steering, it is possible to improve the steering feel and realize appropriate steering assist.

Figure 7:
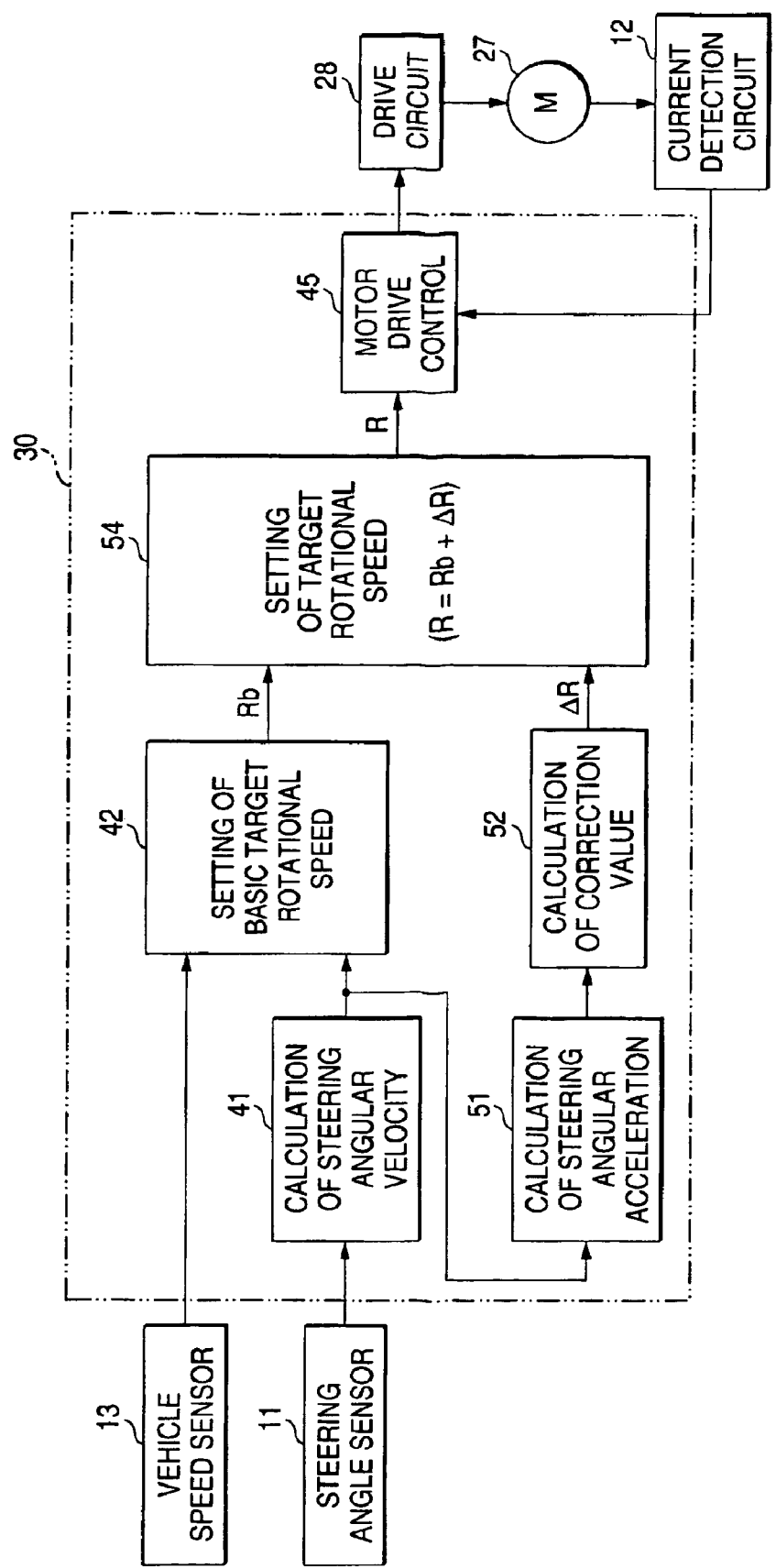
FIG. 7 is a block diagram for explaining the configuration of the power steering apparatus in accordance with a second embodiment of the invention.

FIG. 7 is a block diagram for explaining the configuration of the power steering apparatus in accordance with a second embodiment of the invention. In the description of this embodiment, FIG. 1 which has been referred to above will be referred to again, and in FIG. 7 portions corresponding to the respective portions shown in FIG. 2 referred to above will be denoted by the same reference numerals as those in FIG. 2.

In this embodiment, as the function means which are realized as the CPU 31 executes the program stored in the ROM 33, the electronic control unit 30 has a steering-angular-acceleration calculating portion 51 and a correction-value calculating portion 52 for calculating a correction value ΔR corresponding to an output of the steering-angular-acceleration calculating portion 51. The steering-angular-acceleration calculating portion 51 determines an angular acceleration of steering, Vθ', by further subjecting the angular velocity of steering, Vθ, calculated by the steering-angular-velocity calculating portion 41 to time differentiation.

A target-rotational-speed setting portion 54 for setting the target rotational speed R of the electric motor 27 determines the target rotational speed R=Rb+ΔR by adding the correction value ΔR calculated by the correction-value calculating portion 52 to the basic target rotational speed Rb which is set by the basic-target-rotational-speed setting portion 42. Control of the driving of the electric motor 27 is executed by the function of the motor-drive control portion 45 so that the target rotational speed R thus set will be attained.

Figure 8:
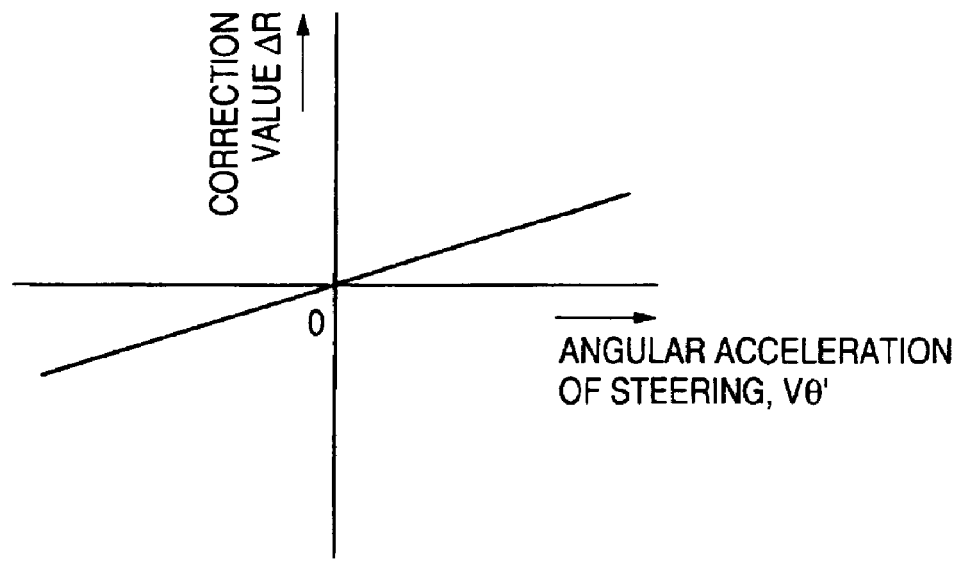
FIG. 8 is a characteristic diagram illustrating an example of the setting of a correction value corresponding to the angular acceleration of steering.

FIG. 8 is a diagram for explaining the function of the correction-value calculating portion 52, and is a characteristic diagram illustrating the relationship between the correction value ΔR and the angular acceleration of steering, Vθ', which is calculated by the steering-angular-acceleration calculating portion 51. The correction-value calculating portion 52 sets the correction value ΔR so that it increases monotonously with an increase in the angular acceleration of steering, Vθ', (increases in direct proportion thereto in this embodiment).

According to the configuration of this embodiment, since the target rotational speed R is set by adding the correction value ΔR corresponding to the angular acceleration of steering, Vθ', to the basic target rotational speed Rb, it is possible to overcome the discomfort of steering due to the inertia of the electric motor 27. As a result, it is possible to realize a satisfactory steering feel without using an expensive motor such as a low-inertia motor or a brushless motor with a plurality of phases, or without making nonlinear the characteristic of the basic target rotational speed Rb with respect to the angular velocity of steering, Vθ. Namely, it is possible to attain satisfactory steering assist without incurring an increase in cost.

Figure 9:
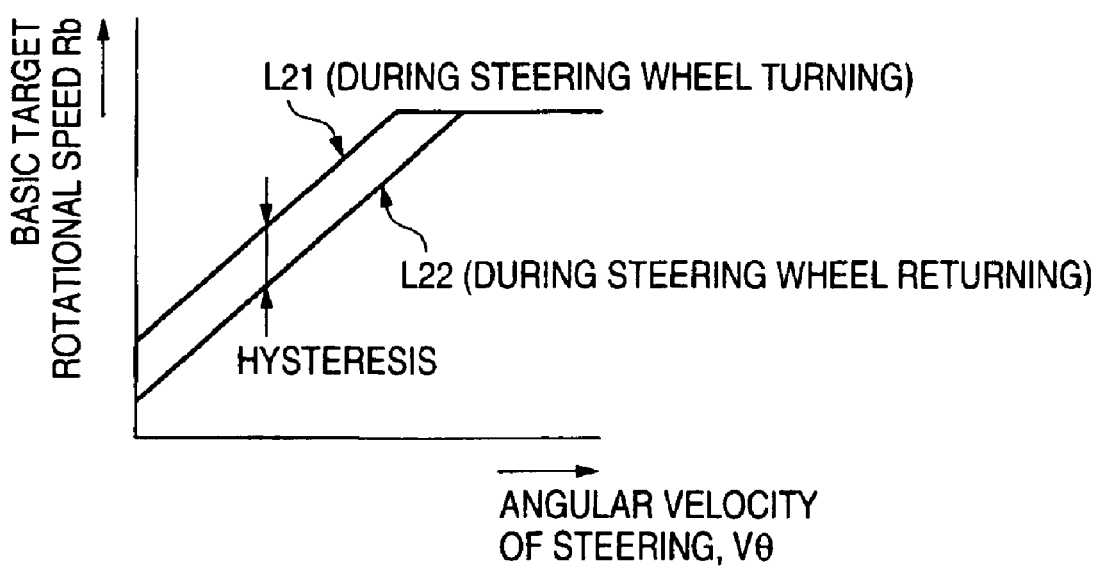
FIG. 9 is a diagram for explaining the power steering apparatus in accordance with a third embodiment of the invention and is a characteristic diagram illustrating the relationship of the basic target rotational speed with respect to the angular velocity of steering.
Figure 10:
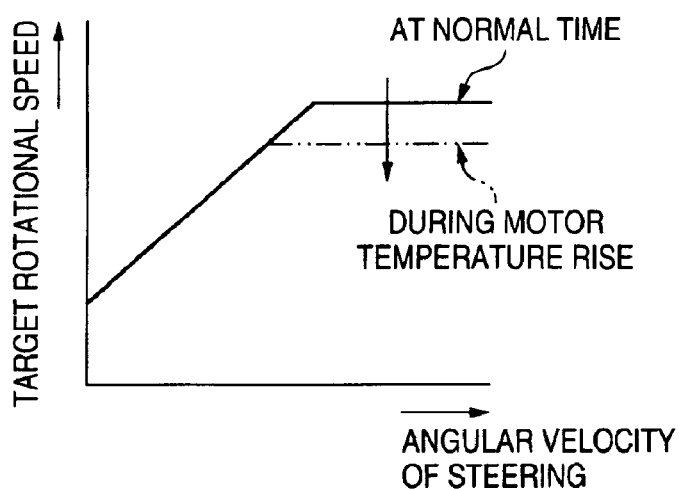
FIG. 10 is a diagram for explaining a measure for preventing an excessive temperature rise of an electric motor in the related art.
Figure 11:
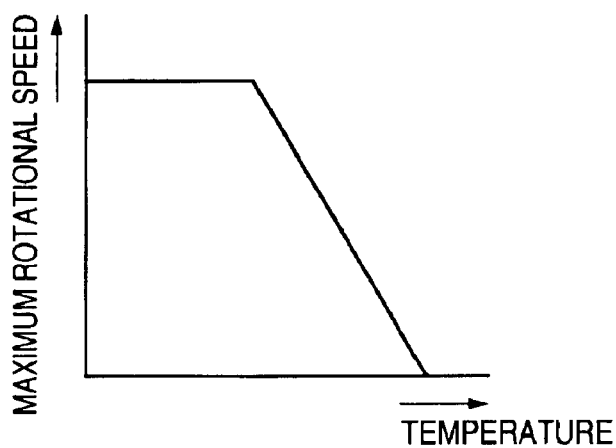
FIG. 11 is a characteristic diagram illustrating a temperature change of a maximum rotational speed of the electric motor in the related art.
Figure 12:
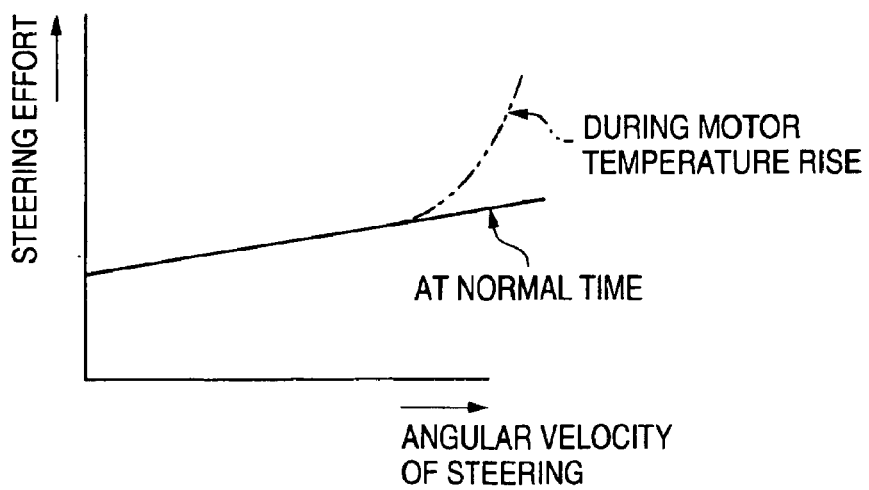
FIG. 12 is a characteristic diagram illustrating a change of the steering effort with respect to the angular velocity of steering in the related art.

FIG. 9 is a diagram for explaining the power steering apparatus in accordance with a third embodiment of the invention, and shows a characteristic diagram illustrating the relationship of the basic target rotational speed Rb with respect to the angular velocity of steering, Vθ. Namely, in this embodiment, the basic-target-rotational-speed setting portion 42 discussed in connection with the above-described first and second embodiments sets the basic target rotational speed Rb in accordance with the characteristic shown in FIG. 9.

Specifically, an amount of hysteresis is set between the time of steering-wheel-turning steering (curve L21), which is steering in the direction away from a midpoint of the steering angle, and the time of steering-wheel-returning steering (curve L22), which is steering in the direction toward the midpoint of the steering angle. A smaller basic target rotational speed Rb is set at the time of steering-wheel-returning steering than at the time of steering-wheel-turning steering. Accordingly, a large steering assisting force is imparted to the steering mechanism 1 at the time of steering-wheel-turning steering in which steering resistance is large, while the steering assisting force is reduced to a low level at the time of steering-wheel-returning steering in which steering resistance is small. Consequently, it is possible to obtain a satisfactory steering feel.

Whether steering-wheel-turning steering or steering-wheel-returning steering is being effected can be determined by the CPU 31 on the basis of the output of the steering angle sensor 11.

Although a description has been given above of the three embodiments of the invention, this invention can be implemented in other forms. For example, although in the above-described embodiments a description has been given of the example in which the target rotational speed is set as a driving target value for driving the electric motor, a drive current value or a drive voltage value of the electric motor may be set as the driving target value for driving the electric motor. In addition, although in the above-described embodiments a description has been given of the case where the basic target rotational speed Rb changes linearly with respect to the angular velocity of steering, Vθ, the change of the basic target rotational speed Rb with respect to the angular velocity of steering, Vθ, may be set nonlinearly. Similarly, the temperature coefficient characteristic shown in FIG. 4 and the correction value characteristic shown in FIG. 8 are mere examples, and a temperature coefficient characteristic or a correction value characteristic which is different from the same may be adopted.

Figure 13:
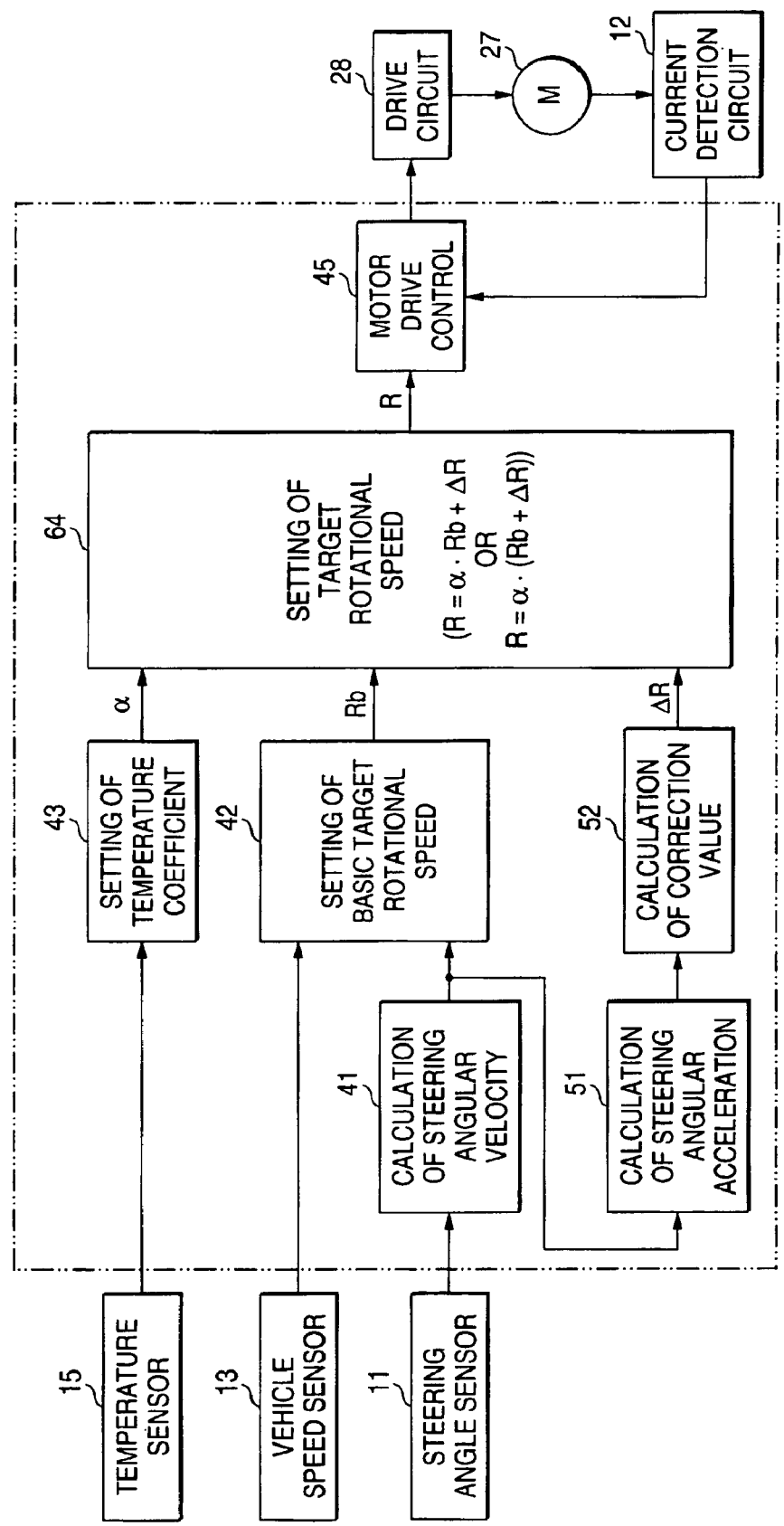
FIG. 13 is a block diagram for explaining the configuration of the power steering apparatus in accordance with a fourth embodiment of the invention

Further, the first and second embodiments may be combined together. This combination can be realized, for example, using an arrangement shown in FIG. 13. In the arrangement shown in FIG. 13, a target-rotational-speed setting portion 64 sets a target rotational speed R based either one of formulae: $R=\alpha \cdot Rb+\Delta R$ and $R=\alpha \cdot (Rb+\Delta R)$ using the temperature coefficient $\alpha$ and the correction value $\Delta R$ respectively discussed in connection with the first and second embodiments. Of course, the basic-target-rotational-speed setting portion 42 in the arrangement shown in FIG. 13 can employ the hysteresis to determine a basic target rotational speed Rb as discussed in connection with the third embodiment.

In addition, various changes in design may be made within the scope of matters described in the claims.

What is claimed is:

1. A power steering apparatus for generating a steering assisting force by hydraulic pressure generated by a pump driven by an electric motor, the apparatus comprising:

steering-angular-velocity calculating means for calculating the angular velocity of steering by an operation member for steering;

steering-angular-acceleration calculating means for calculating the angular acceleration of steering based upon said calculated angular velocity of said steering by an operation by said operation member;

driving-target-basic-value setting means for setting a driving target basic rotational speed value for driving said electric motor on the basis of an output signal of said steering-angular-velocity calculating means;

correction-value setting means for setting a correction rotational speed value for correcting the driving target basic rotational speed value, wherein the correction value is directly proportional to an output of said steering-angular-acceleration calculating means when the output is close to zero and when the output is not close to zero;

driving-target-value setting means for setting a driving target rotational speed value for driving said electric motor by correcting the driving target basic rotational speed value set by said driving-target-basic-value setting means by the correction rotational speed value set by said correction-value setting means; and motor driving means for driving said electric motor on the basis of the driving target rotational speed value set by said driving-target-value setting means.

2. The apparatus of claim 1, wherein said angular acceleration of steering is based upon a time differentiation of said calculated angular velocity of said steering.

3. The apparatus of claim 1, wherein said driving-target-value setting means adds said correction rotational speed value to said driving target basic rotational speed value to provide said driving target rotational speed value.

4. A method of controlling an electric motor driving a hydraulic pump generating a steering assisting force in a power steering apparatus, the method comprising:

calculating the angular velocity of steering by an operation member for steering and generating an output signal indicative of the calculated angular velocity;

calculating the angular acceleration of steering based upon said calculated angular velocity of said steering by an operation by said operation member and generating an output signal indicative of the calculated angular acceleration;

setting a driving target basic rotational speed value for driving said electric motor on the basis of the output signal indicative of the calculated angular velocity;

setting a correction rotational speed value for correcting the driving target basic rotational speed value, wherein the correction rotational speed value is directly proportional to the output signal indicative of the calculated angular acceleration when the output signal is close to zero and when the output signal, which is indicative of the calculated angular acceleration, is not close to zero;

setting a driving target rotational speed value for driving said electric motor by correcting the driving target basic rotational speed value by the correction rotational speed value; and driving said electric motor on the basis of the driving target rotational speed value.

5. The method of claim 2, wherein said angular acceleration of steering is based upon a time differentiation of said calculated angular velocity of said steering.

6. The method of claim 4, wherein setting said driving target rotational speed value comprises adding said correction rotational speed value to said driving target basic rotational speed value.

7. A power steering apparatus comprising:

a steering angle sensor that outputs a steering angle signal that indicates a steering angle;

a steering angle velocity calculator that outputs a steering angle velocity signal based upon the steering angle signal;

a steering angle acceleration calculator that outputs a steering angle acceleration signal based upon a time differentiation of said steering angle velocity signal;

a basic target rotational speed value setter that sets a basic target rotational speed value that is based upon the steering angle velocity signal;

a corrector that outputs a corrected rotational speed signal that is directly proportional to the steering angle acceleration signal when the steering angle acceleration signal is close to zero and when the steering angle acceleration signal is not close to zero; and a target rotational speed setter that sets a target rotational speed based upon the basic target rotational speed value and the corrected rotational speed signal.

8. The apparatus of claim 7, further comprising a motor driver that outputs a motor drive signal based upon the target rotational speed.

9. The apparatus of claim 7, wherein said target rotational speed setter adds said basic target rotational speed value and said corrected rotational speed signal to set said target rotational speed.

10. A method for controlling a power steering apparatus, the method comprising:

- generating a steering angle signal that indicates a steering angle;
- calculating a steering angle velocity signal based upon the steering angle signal;
- calculating a steering angle acceleration signal based upon a time differentiation of said steering angle velocity signal;
- setting a basic target rotational speed value based upon the steering angle velocity signal;
- calculating a rotational speed correction signal that is directly proportional to the steering angle acceleration signal when the steering angle acceleration signal is close to zero and when the steering angle acceleration signal is not close to zero; and
- setting a target rotational speed based upon the basic target rotational speed value and the rotational speed correction signal.

11. The method of claim 10, further comprising outputting a motor drive signal based upon the target rotational speed.

* * * * *